(12) United States Patent
Hidaka et al.

(10) Patent No.: US 10,001,358 B2
(45) Date of Patent: Jun. 19, 2018

(54) MEASURING PROBE AND MEASURING PROBE SYSTEM

(71) Applicant: MITUTOYO CORPORATION, Kanagawa (JP)

(72) Inventors: Kazuhiko Hidaka, Tokyo (JP); Nobuyuki Hama, Hiroshima (JP); Tatsuki Nakayama, Hiroshima (JP); Sadayuki Matsumiya, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 132 days.

(21) Appl. No.: 15/281,326

(22) Filed: Sep. 30, 2016

(65) Prior Publication Data

US 2017/0097221 A1 Apr. 6, 2017

(30) Foreign Application Priority Data

Oct. 6, 2015 (JP) .................................. 2015-198959

(51) Int. Cl.
  *G01B 5/008* (2006.01)
  *G01B 5/012* (2006.01)
  *G01B 5/20* (2006.01)

(52) U.S. Cl.
  CPC ............ *G01B 5/012* (2013.01); *G01B 5/204* (2013.01)

(58) Field of Classification Search
  CPC ...................................... G01B 5/008
  USPC .................. 33/501.14, 501.15, 503, 519
  See application file for complete search history.

(56) References Cited

U.S. PATENT DOCUMENTS

| | | | | |
|---|---|---|---|---|
| 5,829,148 | A * | 11/1998 | Eaton ................. | G01B 5/008 33/503 |
| 6,449,861 | B1 * | 9/2002 | Danielli ............. | G01B 5/012 33/503 |
| 2001/0025427 | A1 * | 10/2001 | Lotze ................. | G01B 21/045 33/559 |
| 2001/0054237 | A1 * | 12/2001 | Hidaka .............. | G01B 7/012 33/561 |
| 2002/0000047 | A1 * | 1/2002 | Yoda ................. | G05B 19/401 33/503 |

(Continued)

FOREIGN PATENT DOCUMENTS

JP 2010-002392 A 1/2010

OTHER PUBLICATIONS

U.S. Appl. No. 15/241,627 to Yoshikazu Ooyama et al., filed Aug. 19, 2016.

*Primary Examiner* — G. Bradley Bennett
(74) *Attorney, Agent, or Firm* — Greenblum & Bernstein, P.L.C.

(57) ABSTRACT

A measuring probe for measuring a screw groove of a relatively rotatable ball screw includes a stylus having a tip end portion configured to contact the screw groove, a radial-direction displacement mechanism configured to support the stylus so as for the stylus to be displaceable in an X direction toward an axial center of the ball screw, an axial-direction displacement mechanism configured to support the stylus so as for the stylus to be displaceable in an axial direction (Z direction) of the axial center, and sensors configured to detect displacement of the stylus produced by the radial-direction displacement mechanism and the axial-direction displacement mechanism. This enables high-accuracy measurement of a predetermined position of a side surface of a relatively rotatable work.

10 Claims, 10 Drawing Sheets

(56) References Cited

U.S. PATENT DOCUMENTS

| | | | |
|---|---|---|---|
| 2009/0133277 A1* | 5/2009 | Tanaka | G01B 5/016 33/558 |
| 2009/0165318 A1* | 7/2009 | Weston | G01B 7/012 33/561 |
| 2015/0285610 A1* | 10/2015 | Knabel | G01B 5/20 33/501.14 |
| 2016/0258733 A1 | 9/2016 | Shimaoka et al. | |
| 2016/0258738 A1 | 9/2016 | Shimaoka et al. | |
| 2016/0258744 A1 | 9/2016 | Shimaoka et al. | |
| 2016/0290797 A1* | 10/2016 | Bos | G01B 21/04 |

* cited by examiner

Fig.11A
Fig.11B
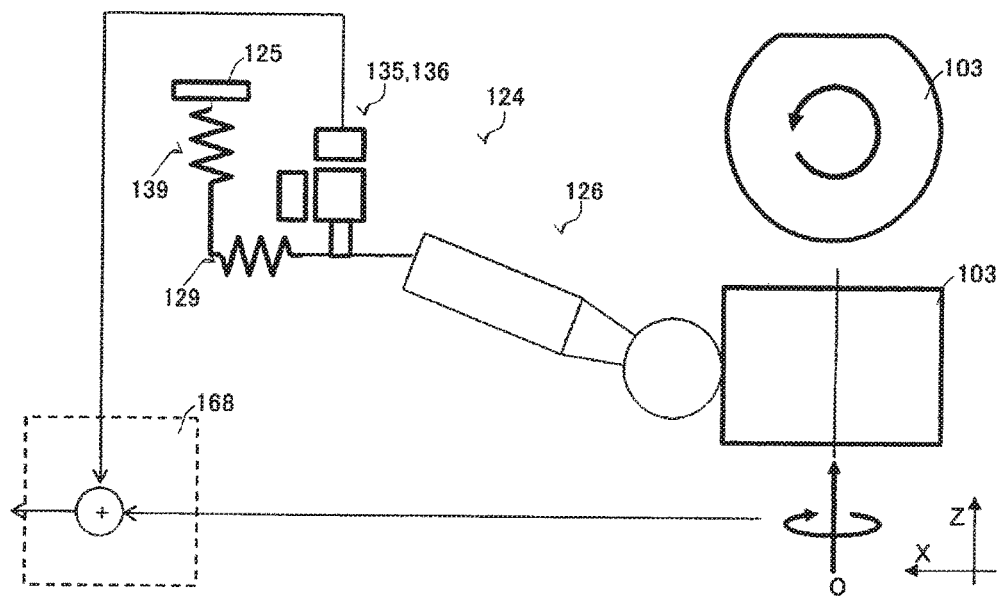
Fig.11C1
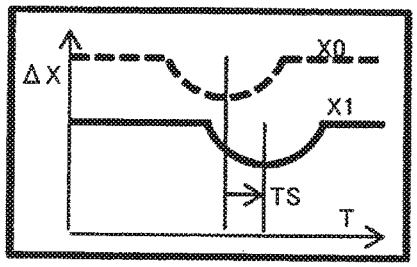
Fig.11C2
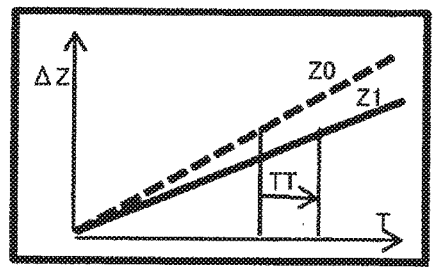
Fig.11C3
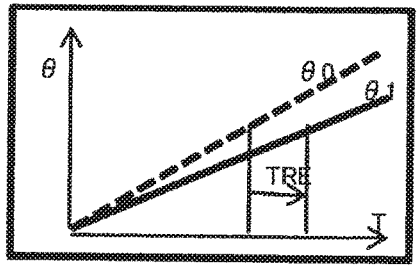
Fig.11C4
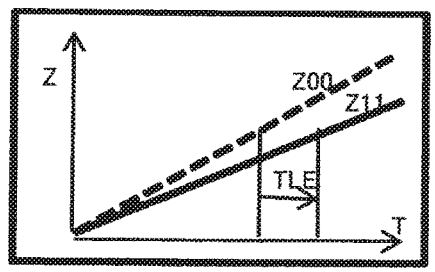

MEASURING PROBE AND MEASURING PROBE SYSTEM

CROSS-REFERENCE TO RELATED APPLICATION

The disclosure of Japanese Patent Application No. 2015-198959 filed on Oct. 6, 2015 including specifications, drawings and claims is incorporated herein by reference in its entirety.

TECHNICAL FIELD

The present invention relates to a measuring probe and a measuring probe system, and more specifically relates to a measuring probe and a measuring probe system enabling high-accuracy measurement of a predetermined position of a side surface of a relatively rotatable work.

BACKGROUND ART

Conventionally, a measuring probe described in JP 2010-2392 A is used. This s measuring probe includes a contacting portion (stylus) to be inserted into a cam groove of a cylindrical cam. And the measuring probe is configured to measure a profile of the cylindrical cam, which is a side surface shape of a work, by making the stylus contact with upper and lower surfaces of the cam groove of the rotated cylindrical cam and moving the stylus upward and downward.

SUMMARY OF INVENTION

Technical Problem

However, in JP 2010-2392 A, a force is applied to the stylus from the cam groove due to the rotation of the cylindrical cam to cause the measuring probe to move upward and downward. Thus, the stylus does not always contact the predetermined desired position of the cam groove reliably, and the predetermined position may not be able to be measured with high accuracy.

The present invention has been made to solve the foregoing problems, and an object of the present invention is to provide a measuring probe and a measuring probe system enabling high-accuracy measurement of a predetermined position of a side surface of a relatively rotatable work.

Solution to Problem

The invention according to a first aspect of the present application solved the above problems by providing a measuring probe for measuring a side surface shape of a relatively rotatable work, including: a stylus having at least one tip end portion configured to contact a side surface of the work; radial-direction displacement mechanism configured to support the stylus so as for the stylus to be displaceable in a direction toward an axial center of the work; an axial-direction displacement mechanism configured to support the stylus so as for the stylus to be displaceable in an axial direction of the axial center; and a sensor configured to detect displacement of the stylus produced by the radial-direction displacement mechanism and the axial-direction displacement mechanism.

In the invention according to a second aspect of the present application, the radial-direction displacement mechanism includes a radial-direction displacement member provided integrally with the stylus, a plurality of first hinge members connected to the radial-direction displacement member and configured to be deformed in correspondence with displacement of the stylus, and a radial-direction housing configured to support the radial-direction displacement member via the plurality of first hinge members, and the axial-direction displacement mechanism includes an axial-direction displacement member configured to support the radial-direction housing, a plurality of second hinge members connected to the axial-direction displacement member and configured to be deformed in correspondence with displacement of the stylus, and an axial-direction housing configured to support the axial-direction displacement member via the plurality of second hinge members.

In the invention according to a third aspect of the present application, the sensor includes a first sensor including a first reference member provided at an end portion of the radial-direction displacement member on a side opposite to the stylus, and a first detection mercer fixed on the radial-direction housing to be opposed to the first reference member and configured to detect a position of the first reference member, and a second sensor including a second reference member provided at an end portion of the axial-direction displacement member, and a second detection member fixed on the axial-direction housing to be opposed to the second reference member and configured to detect a position of the second reference member.

The invention according to a fourth aspect of the present application further includes a buffer mechanism configured to enable restoring forces increasing in accordance with the deformation amounts of the first hinge members and the second hinge members to be decreased, respectively.

In the invention according to a fifth aspect of the present application, the buffer mechanism includes two magnetic structures, and the two magnetic structures are provided on side surfaces of the radial-direction displacement member to be symmetrical to each other.

In the invention according to a sixth aspect of the present application, the radial-direction displacement member includes a clamp mechanism configured to temporarily clamp the radial-direction displacement member to the radial-direction housing.

In the invention according to a seventh aspect of the present application, the plurality of tip end portions are provided, and mutual positions of the rip end portions are relatively adjustable.

The invention according to an eighth aspect of the present application is a measuring probe system including the measuring probe according to the first aspect, including: a rotation mechanism configured to enable relative rotation of the work to the measuring probe; and a signal processing device configured to control the rotation mechanism and to process an output of the measuring probe.

In the invention according to a ninth aspect of the present application, the signal processing device includes a processing unit configured to derive at least one actual side surface shape of the work by processing the output of the measuring probe, and the rotation mechanism includes a rotary encoder configured to output a relative rotation angle of the work, and the processing unit is configured to derive the plurality of actual side surface shapes in initial states in which rotation start positions of the rotation mechanism are different from each other, and perform calculation among the plurality of actual side surface shapes to reduce a measurement error caused by the rotation mechanism.

The invention according to a tenth aspect of the present application further includes a probe support mechanism configured to support the measuring probe so as for the measuring probe to be movable in the axial direction along with rotation by means of the rotation mechanism, the probe support mechanism includes a linear encoder configured to output a position of the measuring probe in the axial direction, and the processing unit is configured to calibrate output reply properties of the measuring probe, the linear encoder, and the rotary encoder when the processing unit derives the actual side surface shape.

According to the present invention, a predetermined position of a side surface of a relatively rotatable work can be measured with high accuracy.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein;

FIG. 9C1 illustrates an initial position of a ball screw against a contact portion, and displacement of contact points when measurement is performed using the measuring probe according to the fifth embodiment of the present invention, setting an advanced rotation angle θi to 0 degrees;

FIG. 9C2 illustrates an initial position of the ball screw against the contact portion, and displacement of the contact points when measurement is performed using the measuring probe according to the fifth embodiment of the present invention, setting the advanced rotation angle θi to 120 degrees;

FIG. 9C3 illustrates an initial position of the ball screw against the contact portion, and displacement of the contact points when measurement is performed using he measuring probe according to the fifth embodiment of the present invention, setting the advanced rotation angle θi to 240 degrees;

FIG. 11A is a functional diagram of a measuring probe according to a sixth embodiment of the present invention;

FIG. 11B is an upper view of a flick standard (magnification calibrator) serving as a work of the measuring probe according to the sixth embodiment of the present invention;

FIG. 11C1 illustrates displacement in the X direction at the time of an output instruction and displacement in the X direction actually output in a delayed manner in the measuring probe according to the sixth embodiment of the present invention;

FIG. 11C2 illustrates displacement in the Z direction at the time of the output instruction and displacement in the Z direction actually output in a delayed manner in the measuring probe according to the sixth embodiment of the present invention;

FIG. 11C3 illustrates a rotation angle at the time of the output instruction and a rotation angle actually output in a delayed manner in a rotary encoder of the measuring probe according to the sixth embodiment of the present invention; and FIG. 11C4 illustrates displacement in the Z direction at the time of the output instruction and displacement in the Z direction actually output in a delayed manner in a linear encoder of the measuring probe according to the sixth embodiment of the present invention.

DESCRIPTION OF EMBODIMENT

Hereinbelow, an example of a first embodiment of the present invention will be described in detail with reference to FIGS. 1 to 4B.

First, an overview of a measuring probe system will be described.

Figure 1:
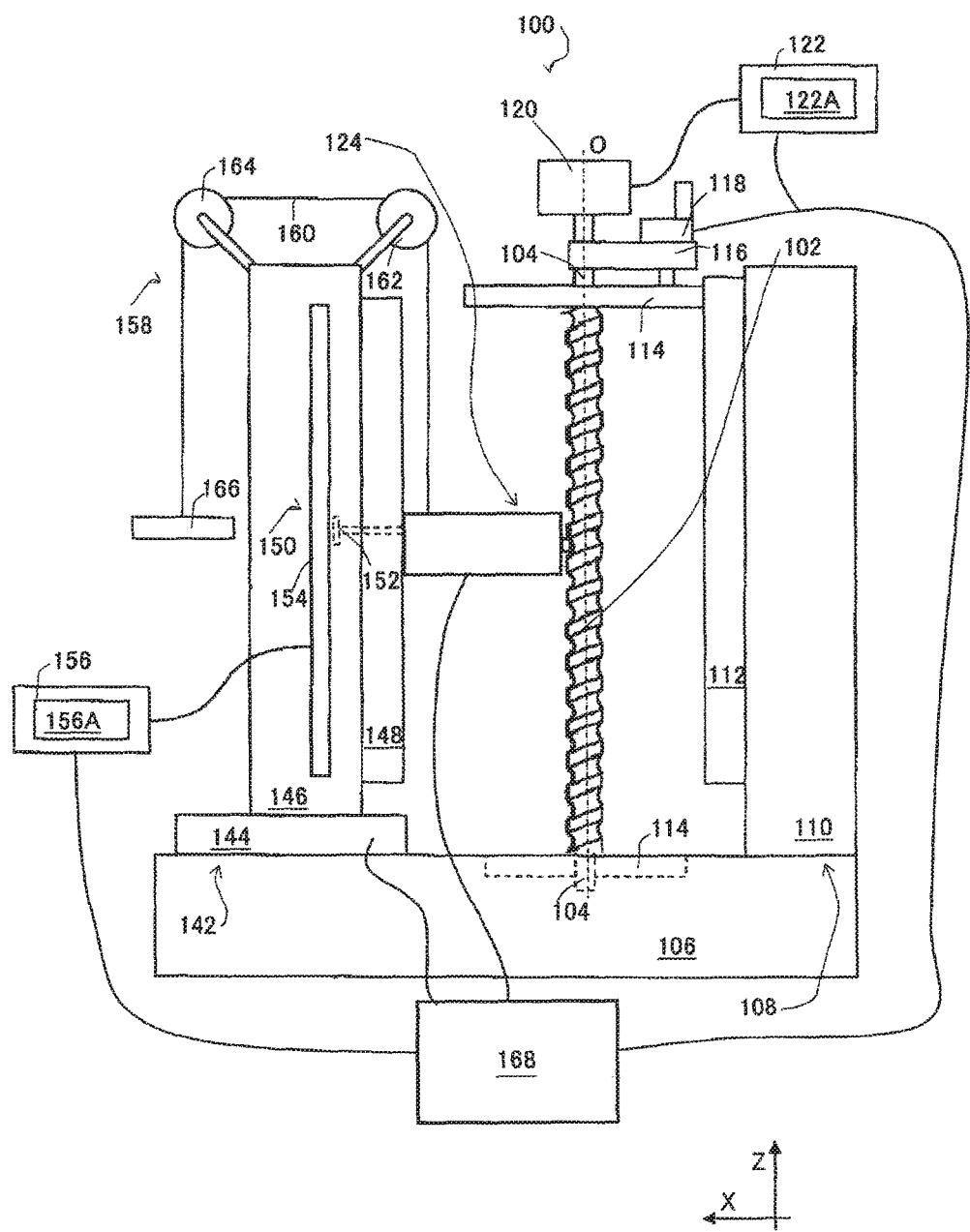
FIG. 1 is a schematic diagram illustrating an example of a measuring probe system according to a first embodiment of the present invention.

A measuring probe system 100 includes a base 106, a rotation mechanism 108, a measuring probe 124, a probe support mechanism 142, and a signal processing device 168, as illustrated in FIG. 1

Figure 3A:
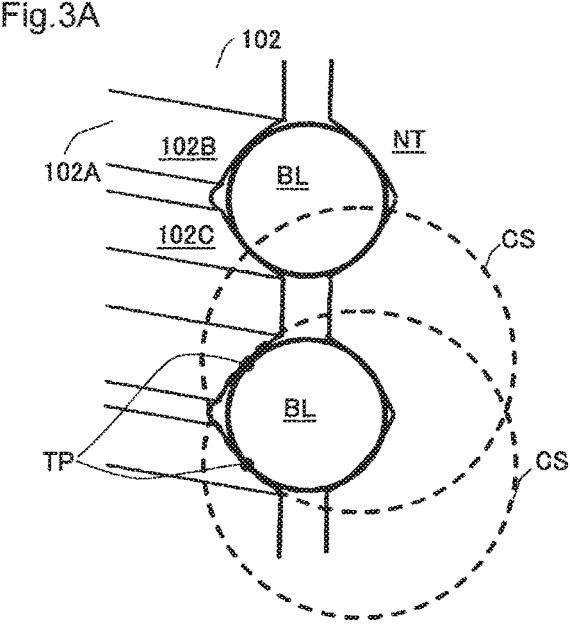
FIG. 3A illustrates shape errors of a screw groove and illustrates a Gothic arch shape and contact points in the screw groove.
Figure 3B:
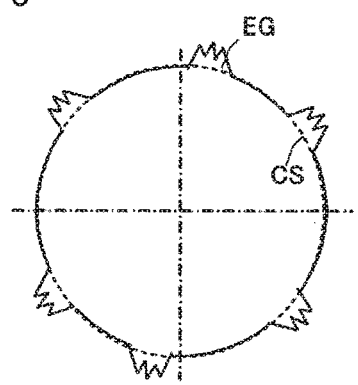
FIG. 3B illustrates the shape errors of the screw groove and illustrates groove diameter irregularities.
Figure 3C:
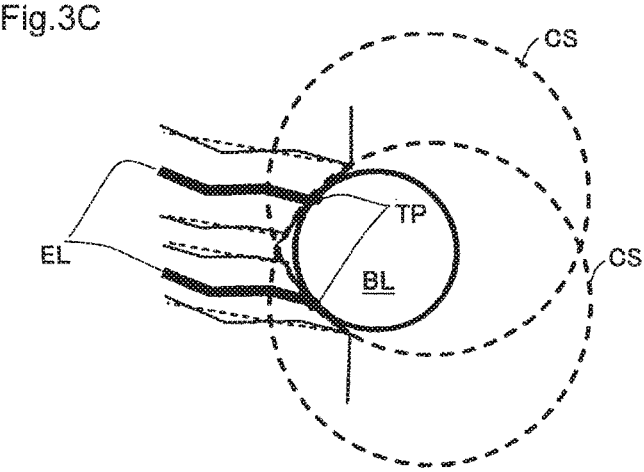
FIG. 3C illustrates the shape errors of the screw groove and illustrates lead irregularities.

In the present embodiment, a work to be measured is a ball screw 102. The ball screw 102 is used to move a slider or the like (not illustrated) of a linear motion stage fixed to a nut NT via balls BL with high accuracy, as illustrated in FIG. 3A, for example. A spiral screw groove 102A (rolling movement surface of the ball BL) at regular lead pitches is provided on a side surface of the ball screw 102, as illustrated in FIG. 3A (that is, a side surface shape of the work is the screw groove 102A). The cross-section of the screw groove 102A is formed in a Gothic arch shape wherein arcs of two circles CS (a cross-sectional shape of a screw groove upper surface 102B and a cross-sectional shape of a screw groove lower surface 102C) overlap with each other to facilitate adjustment of a space between the screw groove 102A and the ball BL, as illustrated in FIG. 3A, for example. The ball EL contacts the screw groove 102A at two contact points TP in total consisting of one contact point on the screw groove upper surface 102B and one contact point on the screw groove lower surface 102C. In the actual screw groove 102A, groove diameter irregularities EG occur on each of these circles CS, as illustrated in FIG. 3B, when the screw groove 102A is formed. Thus, the screw groove 102A causes corresponding lead irregularities (such as random walk of the contact point TP) to occur, as illustrated in FIG. 3C. Accordingly, in the ball screw 102, not only shape errors of a base material thereof (an outer diameter error, an axial center error, a roundness error, and the like) but also shape errors of the screw groove 102A lead pitch error, a lead irregularity, and the like) occur corresponding.

The base 106 is a base supporting the rotation mechanism 108 and the probe support mechanism 142, as illustrated in FIG. 1. The base 106 supports the ball screw 102 as well.

The rotation mechanism 108 is a mechanism configured to rotate the ball screw 102, as illustrated in FIG. 1. That is, the rotation mechanism 108 enables the ball screw 102 to be rotated relatively to the measuring probe 124. The rotation mechanism 108 includes a column 110, a guide 112, a driving source (motor) 118, and a rotary encoder 120 (that is, the rotation mechanism 108 includes the rotary encoder 120 configured to output a relative rotation angle Of the ball screw 102). The column 110 is provided to erect on the base 106 and supports the guide 112. The guide 112 supports one work support member 114 to enable the work support member 114 to approach to and separate from the other work support member 114 arranged directly in the base 106. The work support members 114 rotatably support the ball screw 102 via a rotation shaft 104. That is, by moving the work support member 114 supported to the guide 112, the two work support members 114 can rotatably support each of the ball screws 102 with various lengths.

As illustrated in FIG. 1, the rotation shaft 104 is detachably attached to the ball screw 102 (that is, an axial center O of the rotation shaft 104 is an axial center of the ball screw 102). The rotation shaft 104 is driven to be rotated via a timing belt 116 by the driving source 118. Also, the rotation shaft 104 is directly connected to the rotary encoder 120 (the rotation shaft 104 may be fixed integrally with the ball screw 102). The rotary encoder 120 is connected to a display device 122. This enables a rotation angle of the ball screw 102 to be confirmed on a display unit 122A of the display device 122. The driving source 118 and the display device 122 are connected to the signal processing device 168.

The measuring probe 124 is arranged to be opposed to the screw groove (side surface) 102A of the ball screw 102 and can contact and measure the side surface shape (screw groove 102A) of the ball screw 102 that can be rotated by the rotation mechanism 108, as illustrated in FIG. 1. The measuring probe 124 will be described in detail below.

The probe support mechanism 142 is a mechanism configured to support the measuring probe 124 to enable the measuring probe 124 to be opposed to the side surface of the ball screw 102, as illustrated in FIG. 1. The probe support mechanism 142 includes an adjustment stage 144, a column 146, a Z stage 148, a linear encoder 150, and a balance mechanism 158. The adjustment stage 144 is movable in an X direction on the base 106 to position the measuring probe 124 with respect to the axial center O of the rotation shaft 104 (the adjustment stage 144 may be movable not only in the X direction but also in a Y direction perpendicular to the X direction). The column 146 is provided to erect on the adjustment stage 144 and supports the Z stage 148. The Z stage 148 supports the measuring probe 124 so as for the measuring probe 124 to be movable in a Z direction. The linear encoder 150 is provided in the column 146. That is, the probe support mechanism 142 supports the measuring probe 124 so as for the measuring probe 124 to be movable in an axial direction (Z direction) along with rotation by means of the rotation mechanism 108. The probe support mechanism 142 includes the linear encoder 150 configured to output a position of the measuring probe 124 in the axial direction (Z direction).

As illustrated in FIG. 1, the linear encoder 150 includes a detection head 152 and a linear scale 154. The detection head 152 is fixed to the measuring probe 124, and the linear scale 154 is fixed to the column 146. The linear encoder 150 is connected to a display device 156. This enables a position of the measuring probe 124 in the Z direction to be confirmed on a display unit 156A of the display device 156. As illustrated in FIG. 1, the adjustment stage 144 and the display device 156 are connected to the signal processing device 168.

As illustrated in FIG. 1, the balance mechanism. 158 is a mechanism configured to achieve movement of the measuring probe 124 with a small force. That is, the balance mechanism. 158 enables the driving source 118 to move the measuring probe 124 with small torque and enables a measuring force of the measuring probe 124 in the Z direction to be low. The balance mechanism 158 includes a wire 160, two pulleys 162 and 164, and a balancer 166. The wire 160 connects the balancer 166, which is approximately equivalent in weight to the measuring probe 124, to the measuring probe 124. The two pulleys 162 and 164 are rotatably fixed to the column. 146 and movably support the wire 160. However, such a balance mechanism is not essential.

The signal processing device 168 is arranged outside the measuring probe 124 and includes a storage unit configured to store various initial values, and a processing unit configured to read out the various initial values stored in the storage unit and to perform calculation, as illustrated in FIG. 1. Specifically, the processing unit reads out design data of the ball screw 102 from the storage unit and derives coordinates representing the shape of the screw groove 102A.

The processing unit also controls the driving source 118 and rotates the ball screw 102. The processing unit correlates a rotation angle of the ball screw 102 output from the rotary encoder 120 with a position of the measuring probe 124 in the Z direction output from the linear encoder 150, and processes an output of the measuring probe 124. That is, the processing unit can derive an actual side surface shape of the ball screw 102 (actual shape of the screw groove 102A) by processing the output of the measuring probe 124. In other words, the signal processing device 168 controls the rotation mechanism 108 and processes the output of the measuring probe 124. The signal processing device 168 is connected to input devices such as a keyboard and a mouse, and the input devices enable input of instructions, setting of initial values, and selection and determination of processing procedures in an appropriate manner.

Next, the measuring probe 124 will be described mainly with reference to FIGS. 2A to 2G.

Figure 2A:
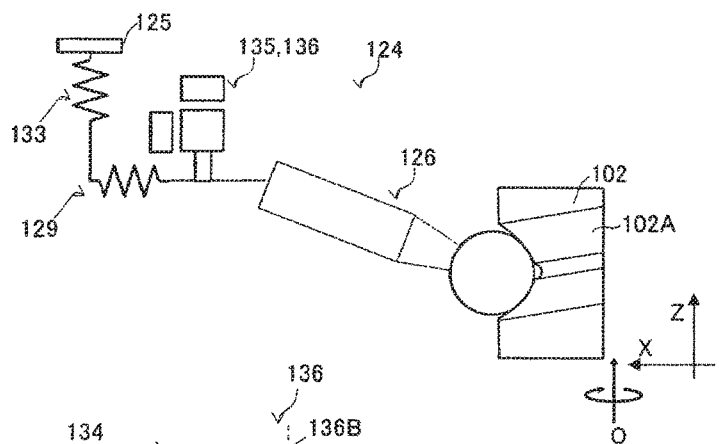
FIG. 2A is a functional diagram of a measuring probe in FIG. 1.
Figure 2B:
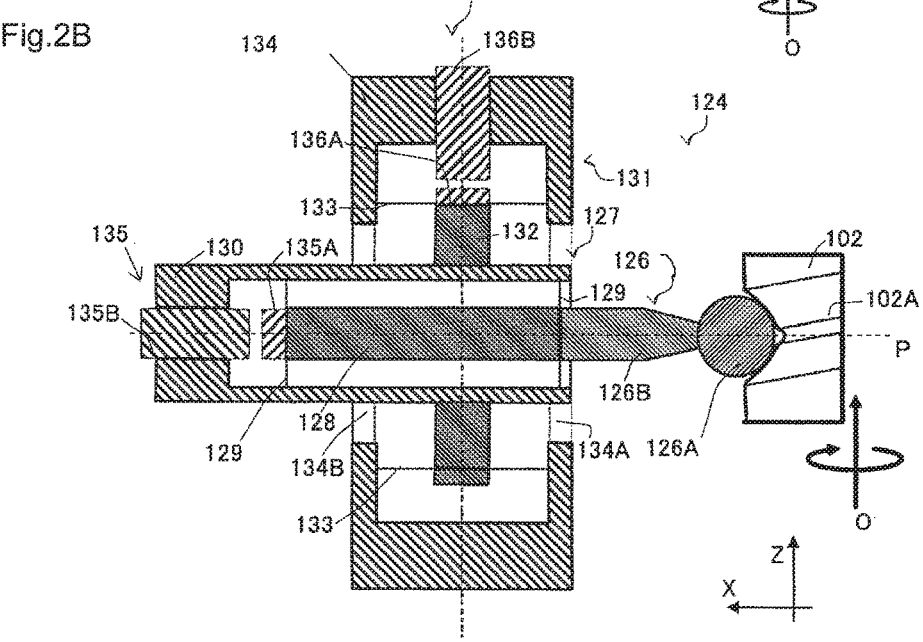
FIG. 2B is a cross-sectional diagram of the measuring probe in FIG. 1.

The measuring probe 124 includes a stylus 126, a radial-direction displacement mechanism 127, an axial-direction displacement mechanism 131, and sensors 135 and 136, as illustrated in FIGS. 2A and 2B. The stylus 126 includes a tip end portion 126A contacting the screw groove 102 and a rod portion 126B supporting the tip end portion 126A. The tip end portion 126A is spherical, is approximately equivalent in size to the ball BL, and contacts the screw groove 102A at two points (contact points TP). Thus, the size of the tip end portion 126A is changed in accordance with the size of the ball BL. The rod portion 126B is a rod-like member and is supported by the radial-direction displacement mechanism 127.

The radial-direction displacement mechanism 127 supports the stylus 126 so as for the stylus 126 to be displaceable in the X direction toward the axial center O of the ball screw 102, as illustrated in FIG. 2B. Specifically, the radial-direction displacement mechanism 127 includes a radial-direction displacement member 128 provided integrally with the stylus 126, two first hinge members 129 (two or more first hinge members 129 may be provided) deformed in correspondence with displacement of the stylus 126 (in the X direction) connected to the radial-direction displacement member 128, and a radial-direction housing 130 supporting the radial-direction displacement member 128 via the two first hinge members 129, as illustrated in FIG. 2B. The radial-direction displacement member 128 is a rod-like member and is supported around its both ends by the first hinge members 129.

Figure 2C:
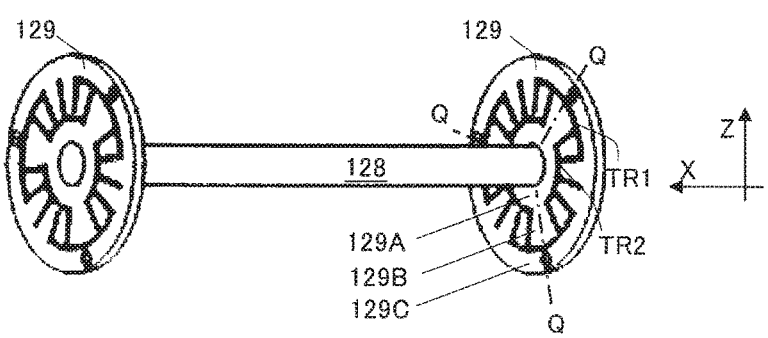
FIG. 2C illustrates first hinge members of the measuring probe in FIG. 1.

Each of the first hinge members 129 is a circular plate-like member, as illustrated in FIG. 2C. The first hinge member 129 includes a center portion 129A, a rim portion 129B, and a peripheral portion 129C. The center portion 129A supports the radial-direction displacement member 128. The rim portion 129B includes two turning portions TR1 and TR2 which are cut off symmetrically with regard to an axis Q. One end of the rim portion 129B is connected to the center portion 129A, while the other end thereof is connected to the peripheral portion 129C. The three rim portions 129B are arranged at regular intervals in the circumferential direction. The peripheral portion 129C supports the center portion 129A via the rim portions 129B. The peripheral portion 129C is supported by the cylindrically shaped radial-direction housing 130. Thus, when an external force is applied to the tip end portion 126A in the X direction, the first hinge member 129 is elastically deformed at the two turning portions TR1 and TR2. At this time, the first hinge member 129 is displaced in the X direction at predetermined spring constant without the stylus 126 integrated with the radial-direction displacement member 128 being rotated around an axis P.

The axial-direction displacement mechanism 131 supports the stylus 126 so as for the stylus 126 to be displaceable in the axial direction (Z direction) of the axial center O of the ball screw 102 as illustrated in FIG. 2B. Specifically, the axial-direction displacement mechanism 131 includes an axial-direction displacement member 132 supporting the radial-direction housing 130, two second hinge members 133 (two or more second hinge members 133 may be provided) connected to the axial-direction displacement member 132 and deformed in correspondence with displacement of the stylus 126 (in the Z direction), and an axial-direction housing 134 supporting the axial-direction displacement member 132 via the two second hinge members 133, as illustrated in FIG. 2B. The axial-direction displacement member 132 is a rod-like member and is supported around its both ends by the second hinge members 133.

Each of the second hinge members 133 is a circular plate-like member similar to the first hinge member 129. Thus, description of the second hinge member 133 is omitted. The axial-direction housing 134 is a cylindrically shaped member and supports the second hinge members 133. The axial-direction housing 134 includes opening portions 134A and 134B enabling the axial-direction housing 134 to keep a non-contact state with the radial-direction housing 130, even when a position of the radial-direction housing 130 changes. In the present embodiment, the axial-direction housing 134 is integrated with a casing 125 of the measuring probe 124.

The sensors 135 and 136 can detect X-direction displacement and Z-direction displacement of the stylus 126 operated by the radial-direction displacement mechanism 127 and the axial-direction displacement mechanism 131, respectively, as illustrated in FIG. 2A. The sensor 135 includes a reference member 135A provided at an end portion of the radial-direction displacement member 128 on a side opposite to the stylus 126 and a detection member 135B fixed on the radial-direction housing 130 to be opposed to the reference member 135A. The sensor 135 is configured to emit light from the detection member 135B to the reference member 135A and to detect changes of a position of reflected light to detect a position of the reference member 135A in the X direction in a triangulation method using reflection of light, for example. The sensor 136 is configured similarly to the sensor 135 and includes a reference member 136A provided at an end portion of the axial-direction displacement member 132 and a detection member 136B fixed on the axial-direction housing 134 to be opposed to the reference member 136A. As each of the sensors, a linear encoder, a differential transformer, a capacitance sensor, or the like may be used. Outputs of the sensors 135 and 136 are input into the signal processing device 168 and are processed as displacement of the stylus 126.

Next, a procedure for measuring the screw groove 102A performed by the measuring probe 124 will be described.

First, the ball screw 102 as a target to be measured is attached to the work support member 114 so as for the ball screw 102 to be rotatable around the rotation shaft 104. At this time, adjustment is performed so that the axial center O of the rotation shaft 104 may be equal to the center axis of the ball screw 102 as much as possible. Subsequently, the probe support mechanism 142 adjusts so that the height of the measuring probe 124 becomes to match the height of a measurement start position of the hall screw 102, and the axis P of the measuring probe 124 may intersect with the axial center O. The ball screw 102 is then adjusted with use of the rotation mechanism 108 so that the position of the screw groove 102A may be located on the axis P of the measuring probe 124. Positional adjustment of the measuring probe 124 in the X direction is then performed with use of the adjustment stage 144 of the probe support mechanism 142 so that the tip end portion 126A of the stylus 126 of the measuring probe 124 may contact the screw groove 102A appropriately.

Subsequently, by means of an instruction from an input device (not illustrated), a measuring program for the screw groove 102A is started in the signal processing device 168. This causes the ball screw 102 to be rotated at predetermined speed. At this time, the Z-direction position of the screw groove 102A which the tip end portion 126A of the stylus 126 contacts changes, and the height of the measuring probe 124 changes. Detection signals are output in real time from the measuring probe 124, the linear encoder 150, and the rotary encoder 120, and the outputs are processed in the signal processing device 168. Meanwhile, this processing may be performed at the same time as the control or after the end of the control.

Measurement of the ball screw 102 is terminated by the end of the measuring program or an instruction from the input device.

Figure 4A:
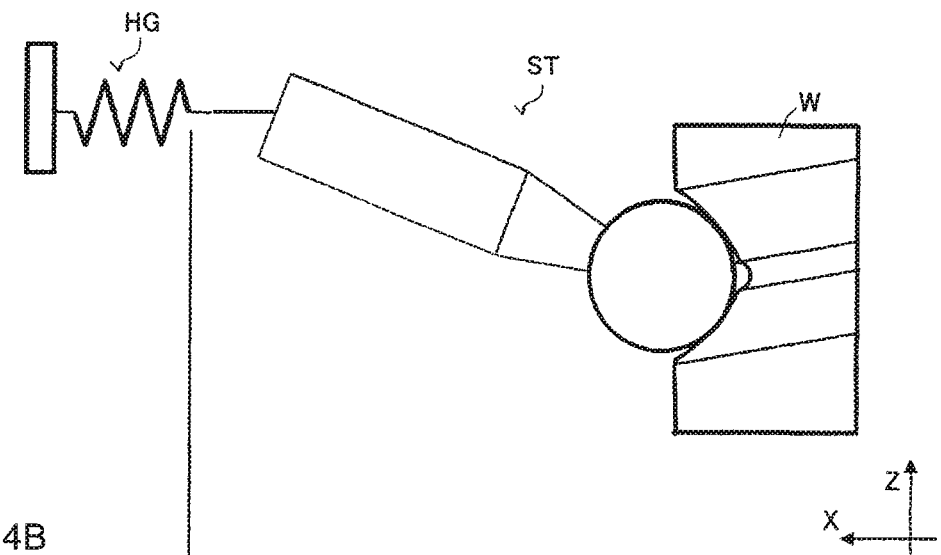
FIG. 4A is a schematic diagram illustrating a problem when a screw groove is measured by a stylus and illustrates a state in which the stylus contacts the screw groove at two points.
Figure 4B:
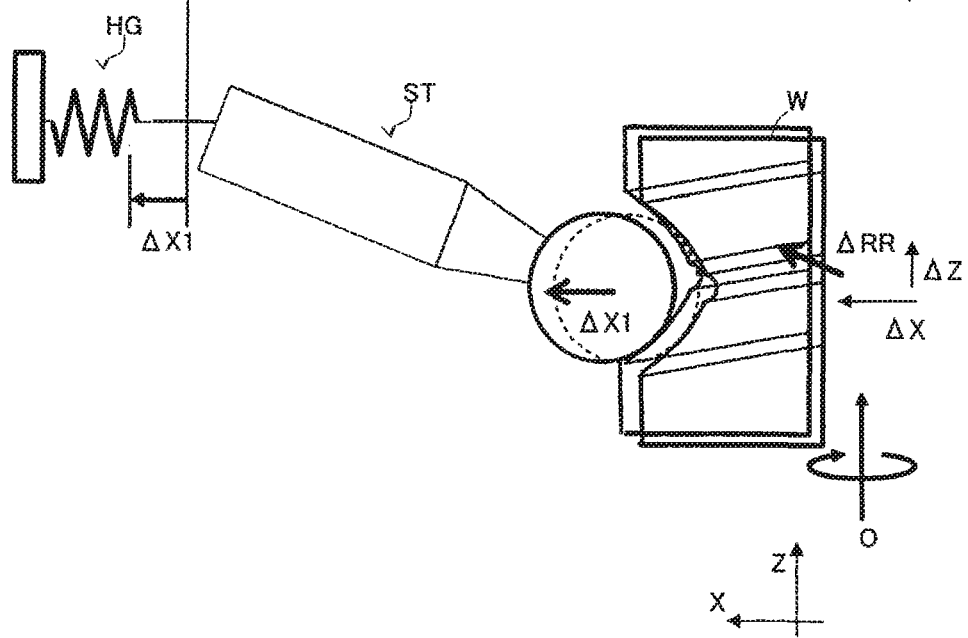
FIG. 4B is a schematic diagram illustrating the problem when the screw groove is measured by the stylus and illustrates a state in which the stylus contacts the screw groove at one point.

Here, as illustrated in a comparative example in FIG. 4A, suppose that, in a measuring probe, a stylus ST is movable only in the X direction due to a first hinge member HG. At this time, as illustrated in FIG. 4B, when the displacement ΔRR including not only displacement ΔX in the X direction but also displacement ΔZ in the Z direction in a screw groove is generated by the rotation of a ball screw W, a tip end portion of the stylus ST may not contact the screw groove at two points but contact the screw groove at one point. At this time, the movement amount of the stylus ST in the X direction will be displacement ΔX1 (>ΔX), not the displacement ΔX, which is supposed to be detected intrinsically. Accordingly, it is difficult for such a measuring probe to accurately measure the displacement ΔX, which is supposed to be detected intrinsically.

Figure 7:
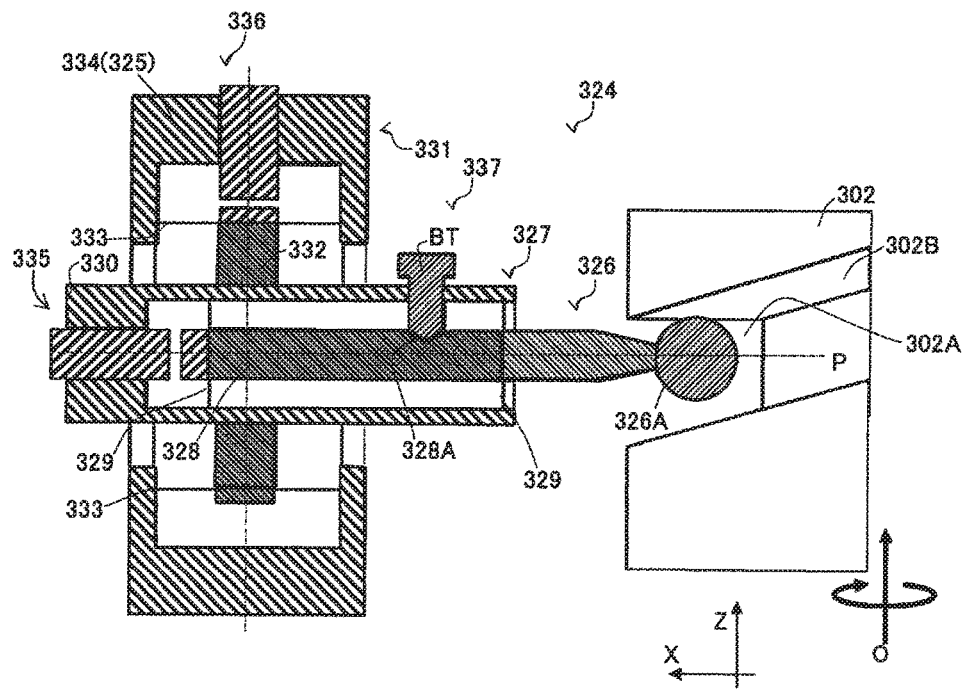
FIG. 7 is a schematic diagram of a measuring probe according to a third embodiment of the present invention.

Meanwhile, FIG. 7 of JP 2010-2392 A illustrates a configuration enabling movement of the stylus ST as illustrated in FIGS. 4A and 4B. That is, in JP 2010-2392 A, movement and detection of the stylus ST in the X direction are enabled, but the movement in the X direction is just performed by the measuring probe supporting the stylus ST. This means that, in JP 2010-2392 A, the first hinge member HG is outside the measuring probe. Thus, it is inferred from a viewpoint of the aforementioned accurate measurement that the configuration of JP 2010-2392 A does not even exert effects of the configuration in FIGS. 4A and 4B.

Conversely, in the present embodiment, the measuring probe 124 itself includes the radial-direction displacement mechanism 127 and the axial-direction displacement mechanism 131 supporting the stylus 126 so as for the stylus 126 to be movable in the two directions consisting of the X direction and the Z direction. That is, high response speed of the stylus 126 in the two directions can be achieved, and the measuring probe 124 can follow subtle shape changes of the screw groove 102A. Accordingly, even in a case in which the displacement ΔRR as in FIG. 4B is generated, the stylus 126 can keep the two-point contact, and the measuring probe 124 can achieve high-accuracy measurement.

Moreover, in the present embodiment, the measuring probe 124 includes the sensors 135 and 136 detecting respective displacement in the X direction and in the Z direction, respectively. Accordingly, displacement both in the X direction and in the Z direction can be detected with high accuracy. Meanwhile, instead, a sensor detecting displacement both in the X direction and in the Z direction at the same time may be used.

Also, in the present embodiment, the radial-direction displacement mechanism 127 supports the stylus 126, and the axial-direction displacement mechanism 131 supports the radial-direction displacement mechanism 127. Thus, it is possible to respond subtle shape changes of the ball screw 102 in the X direction at higher speed. Also, since the stylus 126 is opposed to the screw groove 102A in the X direction, this results in simplification of the configuration, and the measuring probe 124 can be configured compactly. Meanwhile, instead, the axial-direction displacement mechanism may support the stylus, and the radial-direction displacement mechanism may support the axial-direction displacement mechanism. Also, the axial-direction displacement mechanism and the radial-direction displacement mechanism are not limited to have the configuration as in the present embodiment. And any mechanisms as long as the radial-direction displacement mechanism is a mechanism supporting the stylus so as for the stylus to be displaceable in the X direction toward the axial center O of the ball screw, and as long as the axial-direction displacement mechanism is a mechanism supporting the stylus so as for the stylus to be displaceable in the axial direction (Z direction) of the axial center O of the ball screw, may be used.

Also, in the present embodiment, the measuring probe system 100 includes the rotation mechanism 108 configured to enable relative rotation of the ball screw 102 to the measuring probe 124, and the signal processing device 168 configured to control the rotation mechanism 108 and to process outputs of the measuring probe 124. Thus, even without use of the outputs of the linear encoder 150 and the rotary encoder 120, rough shape changes of the screw groove 102A in the X direction and in the Z direction along with rotation of the ball screw 102 can be detected. Needless to say, in the present embodiment, with use of the outputs of the linear encoder 150 and the rotary encoder 120, an error of the screw groove 102A from a designed shape can be clarified, and a relatively-long period error of the screw groove 102A and dispersion of the contact point (random walk and a lead irregularity) can be measured.

That is, in the present embodiment, a predetermined position of the screw groove 102A of the relatively rotatable ball screw 102 can be measured with high accuracy.

Although the present invention has been described, taking the first embodiment as an example, the present invention is not limited to the above embodiment. That is, it is so be understood that improvement and design changes are available without departing from the spirit and scope of the present invention.

For example, although measuring forces of the measuring probe 124 in the X direction and in the Z direction increase along with displacement of the first hinge members 129 and the second hinge members 133 at each of the predetermined spring constants in the configuration of the first embodiment, the present invention is not limited to this. For example, a second embodiment illustrated in FIGS. 5 and 6A to 6D may be available. In the second embodiment, a buffer mechanism is just added to the measuring probe according to the first embodiment. Thus, description of a configuration except the buffer mechanism is omitted by basically changing the first number of each reference sign.

Figure 5:
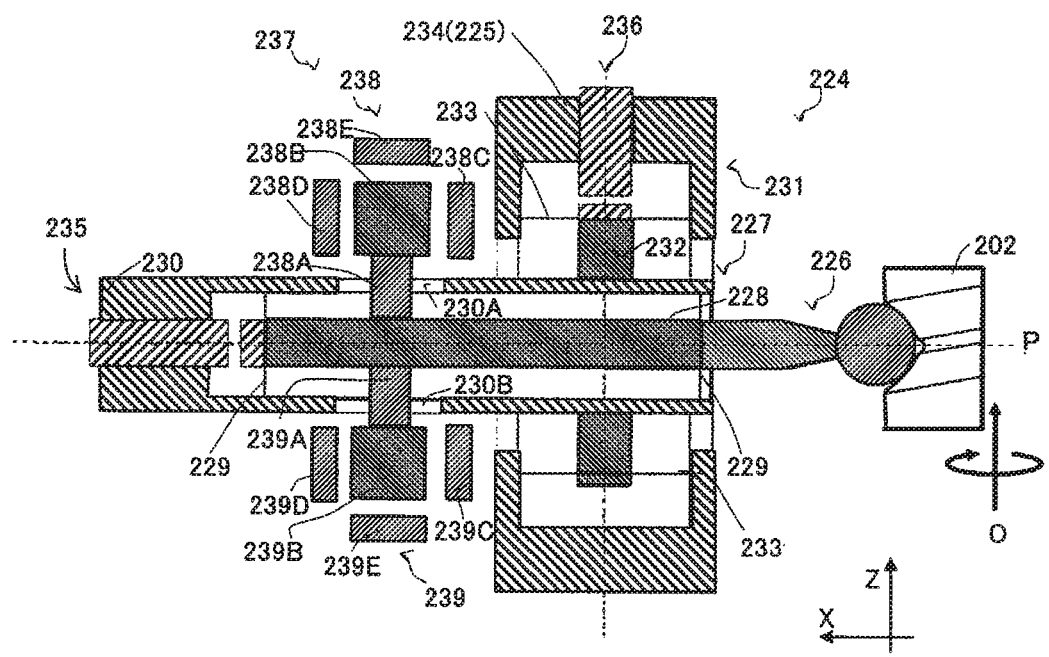
FIG. 5 is a schematic diagram of a measuring probe according to a second embodiment of the present invention.

In the present embodiment a buffer mechanism 237 is a mechanism enabling restoring forces increasing in accordance with the deformation amounts of the first hinge members 229 and the second hinge members 233 to decreased, respectively. Specifically, as illustrated in FIG. 5, the buffer mechanism 237 includes two magnetic structures 238 and 239. The magnetic structure 238 includes a support portion 238A, a magnetic member 238B, and permanent magnets 238C, 238D, and 238E. Also, the magnetic structure 239 includes a support portion 239A, magnetic member 239B, and permanent magnets 239C, 239D, and 239E.

As illustrated in FIG. 5, the support portion 238A is fixed on a side surface of a radial-direction displacement member 228, and projects outward from an opening portion 230A of a radial-direction housing 230 to keep a non-contact state with the radial-direction housing 230. To a tip end of the support portion 238A, the magnetic member 238B is fixed. On the other hand, the support portion 239A is symmetrically on an opposite side surface of the radial-direction displacement member 228 to the side surface on which the support portion 238A is fixed, and projects outward from an opening portion 230B of the radial-direction housing 230 to keep a non-contact state with the radial-direction housing 230. To a tip end of the support portion 239A, the magnetic member 239B is fixed.

As illustrated in FIG. 5, each of the magnetic members 238B and 239B is formed in a rectangular solid shape, for example. Each of the permanent magnets 238C, 238D, 238E, 239C, 239D, and 239E is formed in a plate shape and is fixed in a casing 225 integrated with an axial-direction housing 234. Here, the permanent magnets 238C, 238D, 238E, 239C, 239D, and 239E are arranged so that magnetic attraction forces may be balanced out in each of the X and Z directions with respect to center positions (each corresponding to the black circle in FIGS. 6A and 6D) of the magnetic members 238B and 239B in an initial state in which first hinge members 229 and second hinge members 233 are not deformed. Suppose that magnetic forces of the permanent magnets 238C, 238D, 239C, and 239D are all equal, and that a magnetic force of each of the permanent magnets 238E and 239E is equal to twice a magnetic force of the permanent magnet 238C. In this case, a distance between the permanent magnet 238C and the magnetic member 238B is equal to each Of a distance between the permanent magnet 238D and the magnetic member 238B, a distance between the permanent magnet 239C and the magnetic member 239B, and a distance between the permanent magnet 239D and the magnetic member 239B in the X direction. At the same time, a distance between the permanent magnet 238E and the magnetic member 238B is equal to a distance between the permanent magnet 239E and the magnetic member 239B in the Z direction.

Figure 6A:
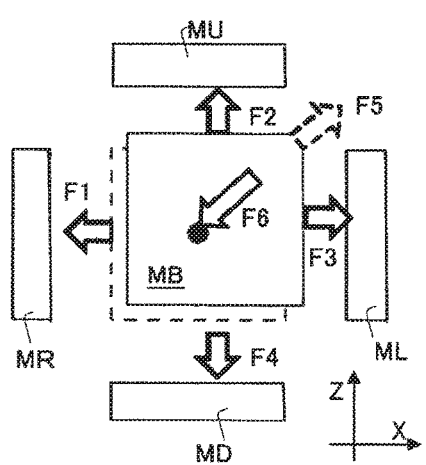
FIG. 6A illustrates a buffer mechanism of the measuring probe in FIG. 5 and illustrates plural forces applied to the buffer mechanism.

Here, FIG. 6A schematically illustrates relationship between a magnetic member MB and each of permanent magnets MU, MD, MR, and ML corresponding to the configuration of the buffer mechanism 237. In FIG. 6A, the magnetic member MB corresponds to the magnetic members 238B and 239B, the permanent, magnet MU corresponds to the permanent magnet 238E, the permanent magnet MD corresponds to the permanent magnet 239E, the permanent magnet MR corresponds to the permanent magnets 238D and 239D, and the permanent magnet ML corresponds to the permanent magnets 238C and 239C.

Figure 6B:
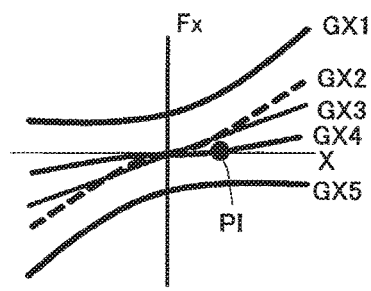
FIG. 6B illustrates the buffer mechanism of the measuring probe in FIG. 5 and illustrates forces applied in an X direction.
Figure 6C:
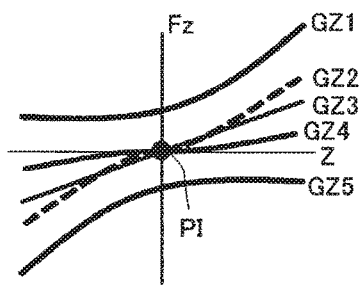
FIG. 6C illustrates the buffer mechanism of the measuring probe in FIG. 5 and illustrates forces applied in a Z direction.
Figure 6D:
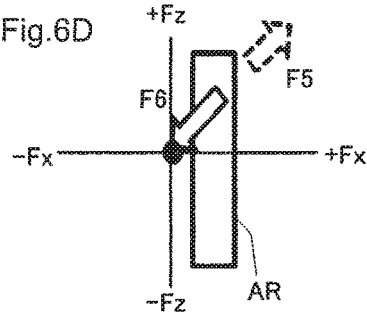
FIG. 6D illustrates the buffer mechanism of the measuring probe in FIG. 5 and illustrates relationship between a displacement region of a stylus and a force at XZ coordinates.

In a state of X and Z=0 in FIGS. 6B and 6C, the magnetic member MB is arranged to have equal distances from the permanent magnets MU, MD, MR, and ML. That is, effects of forces F2, F4 F1, and F3 (solid line arrows) produced by the permanent magnets MU, MD, MR, and ML are completely balanced out. However, when the magnetic member MB is displaced from the dashed line position to the solid line position illustrated in FIG. 6A, in the case that there is not any of the permanent magnets MU, MD, MR, and ML, the magnetic member MB produces a force F6 (solid line arrow) to be restored to the original position due to the first and second hinge members (229 and 233). However, when the magnetic member MB is displaced, the magnetic member MB approaches any of the permanent magnets (permanent magnets MU and ML in FIG. 6A). Thus, a force F5 decreasing the force F6 is generated in an opposite direction to the force F6. As a result, when a stylus 226 moves to a displacement region AR shown by the solid line illustrated in FIG. 6D, the buffer mechanism 237 is activated.

In FIG. 6B, a solid line GX1 represents a force applied to the magnetic member MB in the H direction by a magnetic force of the permanent magnet ML, a solid line GX5 represents a force applied to the magnetic member MB in the H direction by a magnetic force of the permanent magnet MR, a dashed line GX2 represents a force applied to the magnetic member MB in the X direction by a resultant force of the magnetic forces of the permanent magnets ML and MR, a solid line GX3 represents a force applied to the magnetic member MB in the X direction by a spring force of the first hinge members (229), a solid line GX4 represents a force applied to the magnetic member MB in the X direction by a resultant force of the magnetic forces of the permanent magnets ML and MR and the spring force of the first hinge members (229). Similarly, in FIG. 6C, a solid line GZ1 represents a force applied to the magnetic member MB in the Z direction by a magnetic force of the permanent magnet MU, a solid line GZ5 represents a force applied to the magnetic member MB in the Z direction by a magnetic force of the permanent magnet MD, a dashed line GZ2 represents a force applied to the magnetic member MB in the Z direction by a resultant force of the magnetic forces of the permanent magnets MU and MD, a sol id line GZ3 represents a force applied to the magnetic member MB in the Z direction by a spring force of the second hinge members (233), a solid line GZ4 represents a force applied to the magnetic member MB in the Z direction by a resultant force of the magnetic forces of the permanent magnets MU and MD and the spring force of the second hinge members (233). Meanwhile, at the time of measurement of the screw groove 102A, the stylus 226 contacts the screw groove 102A with a measuring force which is not zero. Thus, a position PI of the stylus 226 in an initial state at the time of measurement has an offset value in the X direction as illustrated in FIG. 6B and does not have an offset value in the Z direction as illustrated in FIG. 6C.

Accordingly, in the present embodiment, the buffer mechanism 237 does not cause a measuring force to increase drastically even when displacement increases. Thus, even when the displacement amount of the stylus 226 changes significantly, measurement can be performed without lowering accuracy. Meanwhile, instead, the buffer mechanism may be separated into one in the K direction and one in the Z direction, and displacement of the radial-direction displacement member and displacement of the axial-direction displacement member may be buffered against the radial-direction housing and the axial-direction housing, respectively.

Also, although displacement of the stylus in the measuring probe is continuously allowed in the two directions in the above embodiments, the present invention is not limited to this. For example, a third embodiment illustrated in FIG. 7 may be available. In the third embodiment, a clamp mechanism is just added to the measuring probe according to the first embodiment. Thus, description of a configuration except the clamp mechanism is omitted by basically changing the first number of each reference sign.

In the present embodiment, a radial-direction displacement mechanism 327 includes a clamp mechanism 337 in which a radial-direction displacement member 328 is temporarily clamped to a radial-direction housing 330 as illustrated in FIG. 7. Specifically, the radial-direction displacement member 328 has a recess 328A. The radial-direction housing 330 has a female screw, and a blot BT is screwed into the female screw and is retained into the recess 328A to constitute the clamp mechanism 337 (a screwing state of the blot BT may be changed manually or electrically).

In this manner, in the present embodiment, displacement of a stylus 326 in the X direction is completely stopped (clamped) to enable a measuring probe 324 to measure displacement only in the Z direction with high accuracy. For example, as illustrated in FIG. 7, the present embodiment can be applied to a case in which a work is a cylindrical cam 302 and in which displacement of a cam groove upper surface 302B of a cam groove 302A only in the Z direction is to be measured with high accuracy. Since this clamp action itself is temporary, the clamp state can be cancelled as needed, and the stylus 326 can be displaceable in the two directions. Meanwhile, instead, an axial-direction displacement member may be clamped.

Also, although only one tip end portion is provided in the measuring probe in the above embodiments, the present invention is not limited to this. For example, a fourth embodiment illustrated in FIG. 8 may be available. In the fourth embodiment, two tip end portions are just provided in one stylus according to the first embodiment. Thus, description of a configuration except the stylus is omitted by basically changing the first number of each reference sign.

In the present embodiment, two tip end portions 426A and 426AA are provided, and mutual positions of the tip end portions 426A and 426AA are relatively adjustable. Specifically, a stylus 426 includes the tip end portions 426A and 426AA, rod portions 426B and 426BB, a fixed portion 426C, and a varying portion 426CC. The tip end portion 426A is fixed to a tip end of the rod portion 426B. A rear end of the rod portion 426B is fixed to the fixed portion 426C, and the fixed portion 426C is supported by a not-illustrated radial-direction displacement member. On the other hand, the tip end portion 426AA is fixed to a tip end of the rod portion 426BB. A rear end of the rod portion 426BB is fixed to the varying portion 426CC. The varying portion 426CC is supported via bolts BT1 and BT2 enabling positional adjustment in the two directions (manually or electrically) by the fixed portion 426C. That is, a position of the tip end portion 426AA against the tip end portion 426A is adjustable in the Z direction.

Figure 8:
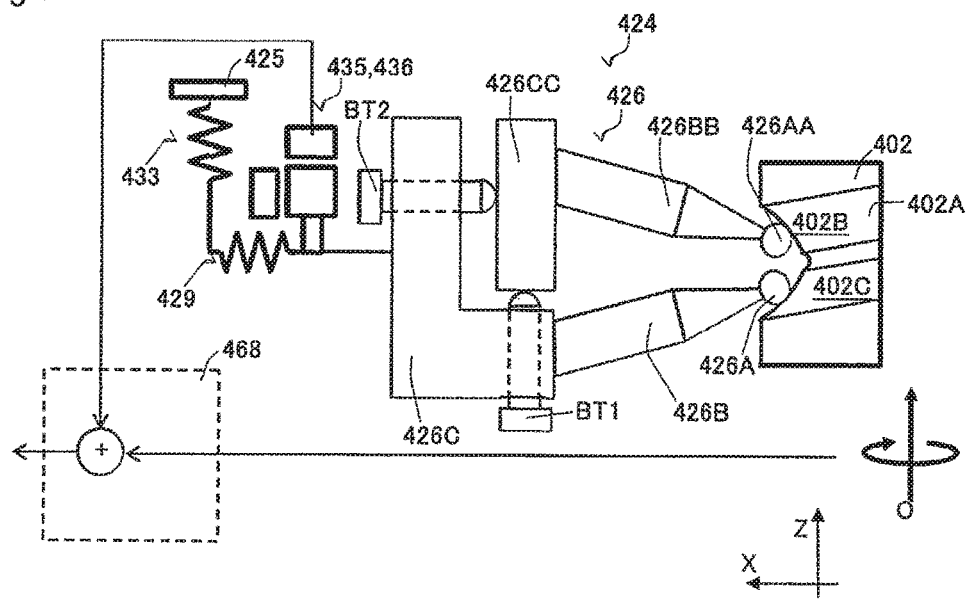
FIG. 8 is a schematic diagram of a measuring probe according to a fourth embodiment of the present invention.
Figure 9A:
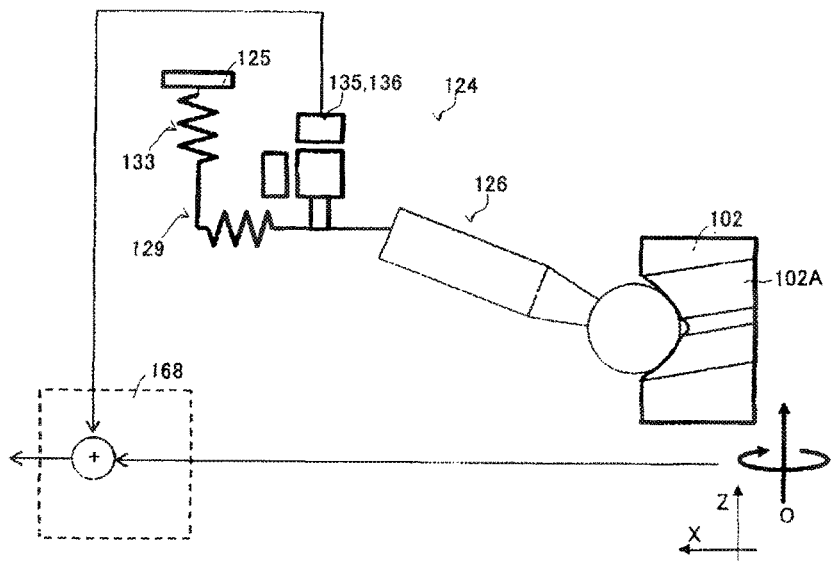
FIG. 9A is a functional diagram of a measuring probe according to a fifth embodiment of the present invention.
Figure 9B:
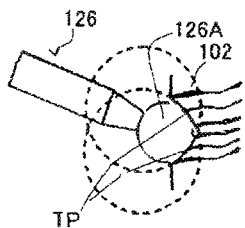
FIG. 9B illustrates a tip end portion of a stylus of the measuring probe according to the fifth embodiment of the present invention and a screw groove.
Figure 9B:
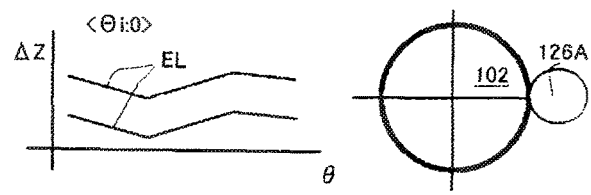
Figure 9B:
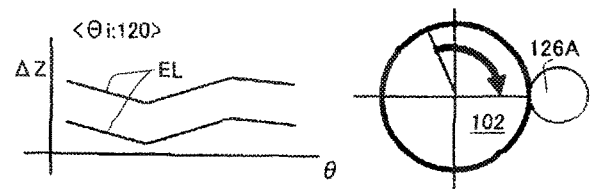
Figure 9B:
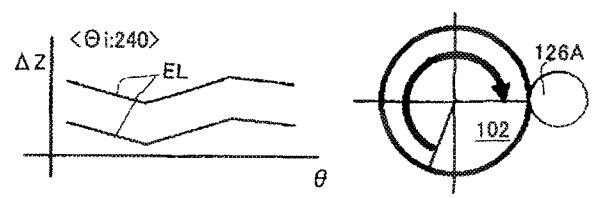

Thus, in the present embodiment, adjustment is available so that the two tip end portions 426A and 426AA may contact a screw groove upper surface 402З and a screw groove lower surface 402C of a screw groove 402A as illustrated in FIG. 8. Accordingly, the screw groove 402A can be measured accurately without changing a stylus to one including a tip end portion equivalent in size to the ball BL (FIG. 3A). Meanwhile, instead, the number of the tip end portions may be three or more in accordance with a work.

Also, although measurement of the screw groove 102A is performed only once in the first embodiment, the present invention is not limited to this. For example, a fifth embodiment illustrated in FIGS. 9A to 9C3 and 10A to 10E may be available. In the fifth embodiment, a measuring probe system is approximately equal to that in the first embodiment in terms of the configuration, and new processing is just performed in measurement of the screw groove 102A. Thus, the same reference signs are used, and description or the configuration is omitted. Meanwhile, in FIGS. 10A to 10E, reference sign EE represents a rotation irregularity, reference sign FG represents a shape of the screw groove 102A, and reference sign RE represents rotation accuracy of the rotation mechanism 108. Also, in FIGS. 10A to 10E, the shape of the screw groove 102A and the rotation accuracy of the rotation mechanism 108 are shown separately for convenience.

Figure 10A:
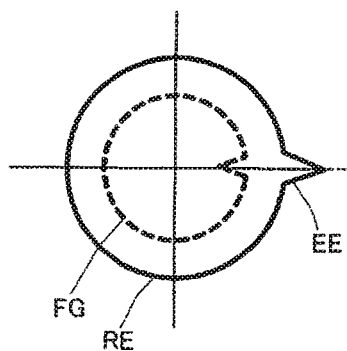
FIG. 10A illustrates relationship between a shape of the ball screw illustrated in FIG. 9A and rotation accuracy of a rotation mechanism, setting the advanced rotation angle θi to 0 degrees.
Figure 10B:
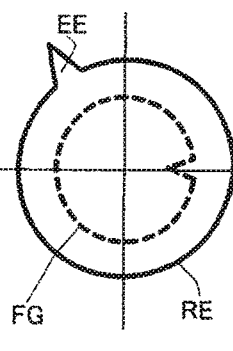
FIG. 10B illustrates relationship between a shape of the ball screw illustrated in FIG. 9A and rotation accuracy of the rotation mechanism, setting the advanced rotation angle θi to 120 degrees.
Figure 10C:
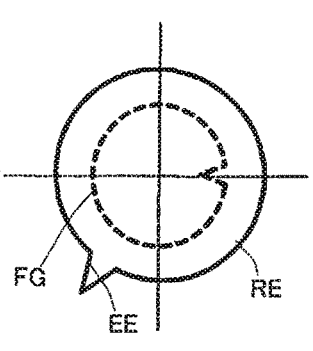
FIG. 10C illustrates relationship between a shape of the ball screw illustrated in FIG. 9A and rotation accuracy of the rotation mechanism, setting the advanced rotation angle θi to 240 degrees.
Figure 10D:
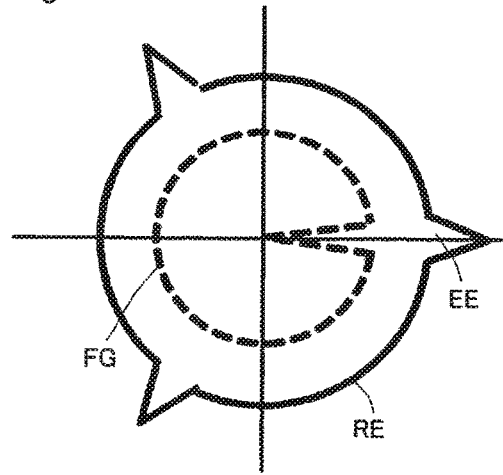
FIG. 10D illustrates relationship between the shapes of the ball screw illustrated in FIG. 9A and the rotation accuracy of the rotation mechanism when the displacement results of the cases of FIGS. 10A to 10C are added.
Figure 10E:
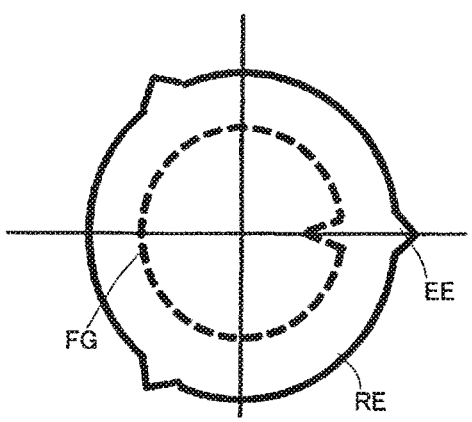
FIG. 10E illustrates relationship between the shapes of the ball screw illustrated in FIG. 9A and the rotation accuracy of the rotation mechanism when the displacement results of the cases of FIGS. 10A to 10C are averaged.

In the present embodiment, as illustrated in FIGS. 9C1 to 9C3, the processing unit derives plural actual shapes of the screw groove 102A in initial states in which rotation start positions of the rotation mechanism 108 are different from each other. The processing unit performs calculation among the plural actual shapes of the screw groove 102A to enable measurement errors caused by the rotation mechanism 108 to be reduced. For example, the ball screw 102 before start of measurement is rotated in advance, setting an advanced rotation angle θi of the ball screw 102 to 0 degrees, 120 degrees, and 240 degrees (respective right figures of FIGS. 9C1 to 9C3). That is, initial conditions for measurement are shifted at predetermined phase distances (120 degrees) (this is also referred to as a phase contrast method). In this state, measurement of the screw groove 102A is started, and displacement in the Z direction is derived (respective left figures of FIGS. 9C1 to 9C3). In this case, in a case in which the positions of the screw groove 102A as a target to be measured are equal, different displacement results (lead irregularities EL) in the Z direction based on the rotation accuracy of the rotation mechanism 108 can be obtained, respectively, as illustrated in FIGS. 10A to 10C. That is, in the present embodiment, by adding (FIG. 10D) these three displacement results (FIGS. 10A to 10C) and deriving an average thereof (FIG. 10E) in the processing unit, for example, measurement errors resulting from the rotation irregularities EE can be reduced. That is, in the present embodiment, higher-accuracy measurement can be achieved. Meanwhile, instead, measurement may be performed twice or four or more times, and the phase contrast method may be applied.

Also, although output properties of the measuring probe and reply properties of the linear encoder and of the rotary encoder are not particularly considered in the first embodiment, the present invention is not limited to this. For example, a sixth embodiment illustrated in FIGS. 11A to 11C4 may be available. In the sixth embodiment, a measuring probe system is approximately equal to that in the first embodiment in terms of the configuration, and new processing is just performed in measurement of the screw groove 102A. Thus, the same reference signs are used, and description of the configuration is omitted.

In the present embodiment, when the processing unit derives an actual side surface shape, which is an actual shape of the screw groove 102A, output reply properties of the measuring probe 124, the linear encoder 150, and the rotary encoder 120 are calibrated. When this calibration is to be performed actually, a flick standard (magnification calibrator) 103 for a roundness measuring machine specified by JIS and ISO is used as a work as illustrated in FIGS. 11A and 11B.

In the present embodiment, when a measured shape is to be derived, the response speed to an output instruction provided by the processing unit differs depending on each of the components. That is, as illustrated in FIGS. 11C1 to 11C4, respectively, the displacement ΔX in the X direction output from the measuring probe 124 is ready to be processed in the processing unit with a time delay TS, the displacement ΔZ in the Z direction output from the measuring probe 124 is ready to be processed in the processing unit with a time delay TT. And the displacement θ of the rotation angle output from the rotary encoder 120 is ready to be processed in the processing unit with a time delay TRE, and the displacement Z in the Z direction output from the linear encoder 150 is ready to be processed in the processing unit with a time delay TLE.

Thus, in the present embodiment, by calibrating the output reply properties of the measuring probe 124, the linear encoder 150, and the rotary encoder 120 in consideration of these time delays TS, TT, TRE, and TLE, and then deriving the actual side surface shape, which is the actual shape of the screw groove 102A, measurement can be performed more accurately than in the above embodiments.

Also, although the work is rotated in the rotation mechanism in the configurations of the above embodiments, the present invention is not limited to this, and the ball screw may be fixed while the measuring probe may be rotated around the ball screw. That is, any configuration is available as long as the work is rotatable relatively to the measuring probe.

The present invention can widely be applied to a measuring probe configured to measure a side surface shape of a relatively rotatable work.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A measuring probe for measuring a side surface shape of a relatively rotatable work, comprising:
    a stylus having at least one tip end portion configured to contact a side surface of the work;
    a radial-direction displacement mechanism configured to support the stylus so as for the stylus to be displaceable in a direction toward an axial center or the work;
    an axial-direction displacement mechanism configured to support the stylus so as for the stylus to be displaceable in an axial direction of the axial center; and
    a sensor configured to detect displacement of the stylus produced by the radial-direction displacement mechanism and the axial-direction displacement mechanism.

2. The measuring probe according to claim 1, wherein
    the radial-direction displacement mechanism includes a radial-direction displacement member provided integrally with the stylus, a plurality of first hinge members connected to the radial-direction displacement member and configured to be deformed in correspondence with displacement of the stylus, and a radial-direction housing configured to support the radial-direction displacement member via the plurality of first hinge members, and
    the axial-direction displacement mechanism includes an axial-direction displacement member configured to support the radial-direction housing, a plurality of second hinge members connected to the axial-direction displacement member and configured to be deformed in correspondence with displacement of the stylus, and an axial-direction housing configured to support the axial-direction displacement member via the plurality of second hinge members.

3. The measuring probe according to claim 2, wherein the sensor includes a first sensor including a first reference member provided at an end portion of the radial-direction displacement member on a side opposite to the stylus, and a first detection member fixed on the radial-direction housing to be opposed to the first reference member and configured to detect a position of the first reference member, and
a second sensor including a second reference member provided at an end portion of the axial-direction displacement member, and a second detection member fixed on the axial-direction housing to be opposed to the second reference member and configured to detect a position of the second reference member.

4. The measuring probe according to claim 2, further comprising a buffer mechanism configured to enable restoring forces increasing in accordance with the deformation amounts of the first hinge members and the second hinge members to be decreased, respectively.

5. The measuring probe according to claim 4, wherein
    the buffer mechanism includes two magnetic structures, and the two magnetic structures are provided on side surfaces of the radial-direction displacement member to be symmetrical to each other.

6. The measuring probe according to claim 2, wherein
    the radial-direction displacement member includes a clamp mechanism configured to temporarily clamp the radial-direction displacement member to the radial-direction housing.

7. The measuring probe according to claim 1, wherein
    the plurality of tip end portions are provided, and mutual positions of the tip end portions are relatively adjustable.

8. A measuring probe system including the measuring probe according to claim 1, comprising:
    a rotation mechanism configured to enable relative rotation of the work to the measuring probe; and
    a signal processing device configured to control the rotation mechanism and to process an output of the measuring probe.

9. The measuring probe system according to claim 8, wherein
    the signal processing device includes a processing unit configured to derive at least one actual side surface shape of the work by processing the output of the measuring probe, and the rotation mechanism includes a rotary encoder configured to output a relative rotation angle of the work, and
    the processing unit is configured to derive the plurality of actual side surface shapes in initial states in which rotation start positions of the rotation mechanism are different from each other, and perform calculation among the plurality of actual side surface shapes to reduce a measurement error caused by the rotation mechanism.

10. The measuring probe system according to claim 9, further comprising a probe support mechanism configured to support the measuring probe so as for the measuring probe to be movable in the axial direction along with rotation by means of the rotation mechanism, wherein
    the probe support mechanism includes a linear encoder configured to output a position of the measuring probe in the axial direction, and
    the processing unit is configured to calibrate output reply properties of the measuring probe, the linear encoder, and the rotary encoder when the processing unit derives the actual side surface shape.

* * * * *